United States Patent

Dijkmans

[11] 4,346,267
[45] Aug. 24, 1982

[54] HYBRID CIRCUIT

[75] Inventor: Eise C. Dijkmans, Eindhoven, Netherlands

[73] Assignee: U.S. Philips Corporation, New York, N.Y.

[21] Appl. No.: 142,939

[22] Filed: Apr. 23, 1980

[30] Foreign Application Priority Data

May 15, 1979 [NL] Netherlands .................... 7903797

[51] Int. Cl.³ ............................................. H04B 1/58
[52] U.S. Cl. ......................... 179/170 NC; 179/170 D
[58] Field of Search ......... 179/170 D, 170 T, 170 NC

[56] References Cited

U.S. PATENT DOCUMENTS 3,689,710 9/1972 Colardelle et al. ............. 179/170 D
3,849,609 11/1974 Voorman ......................... 179/170 T Primary Examiner—Bernard Konick
Assistant Examiner—Randall P. Myers
Attorney, Agent, or Firm—Thomas A. Briody; William J. Streeter; Laurence A. Wright

[57] ABSTRACT

A hybrid circuit comprising a current amplifier connected between the receive path and the transmission path of a four-wire transmission path, the common output of the current amplifier being connected to a two-way transmission path and the balancing impedance and an impedance transformer being provided between the other end of either the balancing impedance or the two-way transmission path, which results in a simple hybrid circuit.

5 Claims, 1 Drawing Figure

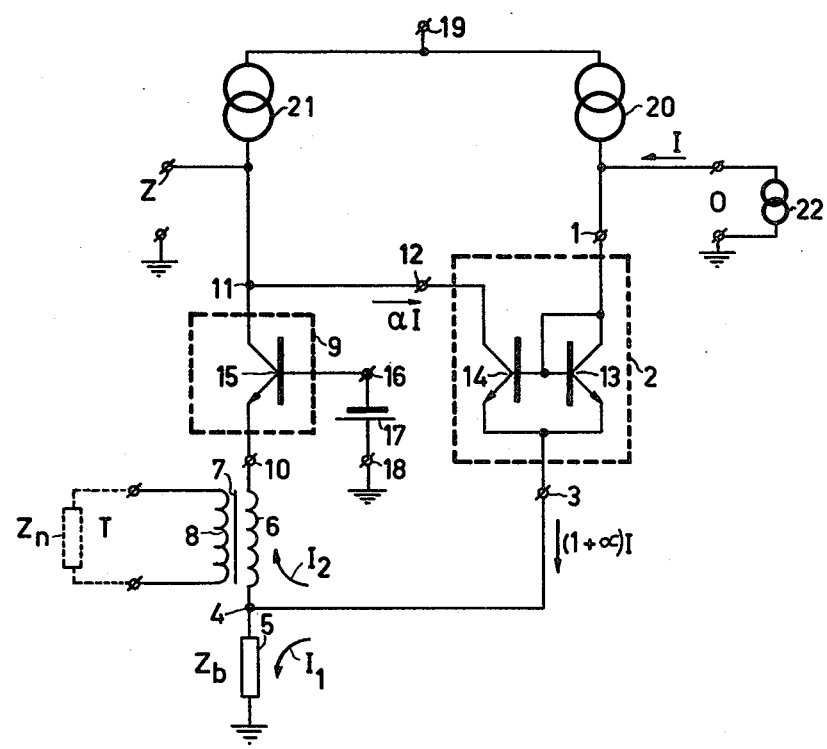

HYBRID CIRCUIT

The invention relates to a hybrid circuit for coupling a two-way transmission path to a one-way transmit path and to a one-way receive path, comprising a balancing impedance which is arranged in series with the two-way transmission path and a current amplifier whose input is connected to the receive path.

BACKGROUND OF THE INVENTION

Such a hybrid circuit is known from Netherlands application No. 7208148 which has been laid open to public inspection, wherein the output of the current amplifier is connected to the two-way transmission path. In addition, this known hybrid circuit comprises a second current amplifier whose input is connected to the two-way transmission line and whose output is connected to the transmission path, and a third current amplifier whose input is connected to the receive path and whose output is connected to the transmit path.

The use of three current amplifiers makes this known hybrid circuit rather complicated, the more so as these three amplifiers must be designed such that the product of current gain factors of the first and the second current amplifier is equal to twice the current gain factor of the third current amplifier. This means that deviations which are the result of manufacturing tolerances produce an unbalance and, consequently, cross-talk from the receive path to the transmit path.

It is an object of the invention to provide a hybrid circuit of the type mentioned in the opening paragraph, which is extremely simple and which depends to a lesser extent on tolerance spread.

SUMMARY OF THE INVENTION

The hybrid circuit according to the invention is characterized in that the hybrid circuit comprises an impedance converter having a high-impedance output coupled to the transmit path and a low-impedance input connected to one end of the series arrangement of the balancing impedance and the two-way transmission path, the other end of the series arrangement being connected to a terminal of common potential and that the output of the current amplifier is connected to the high-impedance output of the converter and the current amplifier comprises a common terminal point which is connected to the junction point of the two-way transmission path and the balancing impedance. As only one current amplifier is used, the hybrid circuit is not only simpler, but less problems as regard tolerance spread are encountered.

In accordance with a preferred embodiment, the impedance converter comprises a transistor the emitter of which is connected to the low-impedance input of the converter the collector to the high-impedance output of the converter and the base to one pole of a reference voltage source, the other pole of which is connected to the terminal of common potential.

By using an impedance converter, comprising a transistor in a grounded base circuit ensures in a very simple manner that the input current, but for a negligible base current, is equal to the output current of this converter so that this converter cannot show tolerance spread in the relation between input and output current.

In accordance with a further preferred embodiment the hybrid circuit comprises a transformer whose primary winding and the balancing impedance form the above-mentioned series arrangement and whose secondary winding is connected to the two-way transmission path. This has the advantage that the two-way transmission path is d.c. isolated from the hybrid circuit.

BRIEF DESCRIPTION OF THE DRAWING

The invention and its advantages will now be further explained with reference to an embodiment shown in the accompanying drawing.

DESCRIPTION OF THE PREFERRED EMBODIMENTS

In the embodiment shown in the Figure, T denotes the two-way transmission line over which signals are transmitted into both directions. The transmission line T is, for example, a subscriber's line of a telephone subscriber. The line O is the one-way receive path via which signals are applied to the hybrid circuit from a so-called 4-wire connection and Z denotes the one-way transmit path via which signals are transmitted to the 4-wire connection from the hybrid circuit.

The receive path is connected to the input 1 of a current amplifier 2 whose common terminal 3 is connected to a junction point 4 of a balancing impedance 5 and a first winding 6 of a transformer 7, a secondary winding 8 of this transformer being connected to the two-way transmit path.

The hybrid circuit further comprises an impedance converter 9 having a low-impedance input 10, which is connected in this embodiment to the primary winding 6, the balancing impedance 5 being connected to a terminal of common potential. The converter 9 has a high-impedance output 11, which is connected to the transmit path Z. The output 12 of the current amplifier 2 is connected to output 11 of the converter 9.

The current amplifier 2 shown in this embodiment comprises a first transistor 13 which is connected as a diode, the collector as well as the base of this first transistor being connected to the input 1 and the emitter to the common terminal 3, and a second transistor 14 whose collector is connected to the output 12, the emitter to the common terminal 3 and the base to the base of the first transistor 13.

It should be noted that any type of current amplifier may be used.

In addition, the impedance converter 9 shown in this embodiment comprises a third transistor 15 whose emitter is connected to the low-impedance input 10 and the collector to the high-impedance output 11 and the base to a pole 16 of a reference voltage source 17, the other pole 18 of which is connected to the terminal of common potential.

In order to apply a bias current to the transistors 13, 14 and 15, a current source 20 is connected to the input 1 of the current amplifier 2 and a current source 21 is connected to the output 11 of the impedance converter.

The hybrid circuit operates as follows:

The alternating current I supplied by a signal current source 22 is applied to the input 1 of the amplifier 2 via the receive path O. The current amplifier 2 amplifies the current I by a factor $\alpha$ and applies the sum of the input current I and the amplified current $\alpha$I to the first winding 6 and the balancing impedance 5 via the common terminal 3, this arrangement being a parallel arrangement owing to the low input impedance 10 of the impedance converter. This sum current $(1+\alpha)$I splits into two currents $I_1$ and $I_2$ in a ratio inversely proportional to the ratio of the impedances of the two branches.

Assuming the two-way transmission path T to have a terminating impedance of a value equal to $Z_n$ and the winding ratio of the transformer to be equal to $\beta$, the current through the terminating impedance $Z_n$ is proportional to $\beta^2 Z_n$. For a value of the balancing impedance 5 equal to $Z_b$ the current $I_2$ through the first winding is proportional to $Z_b$. This current $I_2$ flows to the output 11 via the impedance converter 9, in which it is amplified by a factor $\gamma$. The amplifier 2 takes the current I from this output 11.

If the balancing impedance is made equal to $Z_b = (\alpha\beta^2)/[\alpha(\gamma-1)+\gamma]$. $Z_n$(I) the current applied to the output 11 via transistor 15 is equal to the current taken from the output 11, by amplifier 2 in response to the alternating current applied to the input 1, and hence no signal flow from receive path O to transmit path Z occurs.

Neglecting the base current of the transistor $15\gamma=1$ and it holds that for a balancing impedance $Z_b=\beta^2\alpha Z_n$ the hybrid circuit is in balance.

With a winding ratio equal to unity it holds, that $Z_b=\alpha Z_n$ and, when the current gain factor $\alpha$ has a value equal to unity, the balancing impedance $Z_b$ must be equal to the terminating impedance Zn.

The current $I_2$ flowing through the first winding 6 induces in the winding 8 a current which is applied to the terminating impedance which functions as a load, via the transmission path T.

If a signal is applied to the hybrid circuit via the transmission path T, this signal is transferred to the transmit path Z via the transformer 7 and the impedance converter 9.

It should be noted that the two-way transmission path T may, alternatively, be directly connected between the junction point 4 and the input 10.

Further, the place of the first winding 6 and the two-way transmission path T, if transformer 7 is omitted, can be interchanged with the balancing impedance 5 without affecting the operation. In that case the balancing impedance $Z_b$ and the terminating impedance $Z_n$ in formula I must also be interchanged in the various expression for $Z_b$ given above.

What is claimed is:

1. A hybrid circuit for coupling a two-way transmission path to a one-way transmit path and to a one-way receive path comprising:
   a coupling circuit,
   a balancing impedance with is coupled to the two-way transmission by means of said coupling circuit, a current amplifier whose input is connected to the receive path, said hybrid circuit further comprising an impedance converter which has a high impedance output coupled to said one-way transmit path and a low-impedance input connected to one end of said coupling circuit of said balancing impedance and said two-way transmission path, the other end of said coupling circuit being connected to a terminal of common potential, said output of said current amplifier is connected to the high-ohmic output of said converter and said current amplifier comprises a common terminal connected to the junction point of said two-way transmission path and said balancing impedance.

2. A hybrid circuit as claimed in claim 1, wherein said impedance converter comprises a transistor the emitter of which forms the low-impedance input of the converter, the collector forms the high-impedance output of the converter and the base is connected to a pole of a reference voltage source whose other pole is connected to the terminal of common potential.

3. A hybrid circuit as claimed in claim 1, wherein said current amplifier comprises a first transistor which is connected as a diode and whose collector and base are connected to the input of the amplifier and the emitter to the common terminal and, a second transistor the collector of which is connected to the output of the amplifier, the emitter to the common terminal and the base to the base of the first transistor.

4. A hybrid circuit as claimed in claim 3, wherein the current gain factor of the current amplifier is proportional to the ratio of the impedance connected between the said junction point and the terminal of common potential and the impedance appearing between said junction point and the low-impedance input of the impedance converter.

5. A hybrid circuit as claimed in claim 3, wherein said coupling circuit comprises a transformer whose primary winding and said balancing impedance form a series arrangement and whose secondary winding is connected to said two-way transmission path.

* * * * *

UNITED STATES PATENT AND TRADEMARK OFFICE
CERTIFICATE OF CORRECTION

PATENT NO. : 4,346,267
DATED : August 24, 1982
INVENTOR(S) : EISE C. DIJKMANS

It is certified that error appears in the above-identified patent and that said Letters Patent are hereby corrected as shown below:

Claim 1, line 6, after "transmission" insert --path--,

Signed and Sealed this

Twenty-sixth Day of October 1982

[SEAL]

Attest:

GERALD J. MOSSINGHOFF

Attesting Officer  Commissioner of Patents and Trademarks